Nov. 3, 1936.                    H. F. PARKER                    2,059,271
                           CONTROL SYSTEM AND APPARATUS
                             Filed May 13, 1933           3 Sheets-Sheet 1
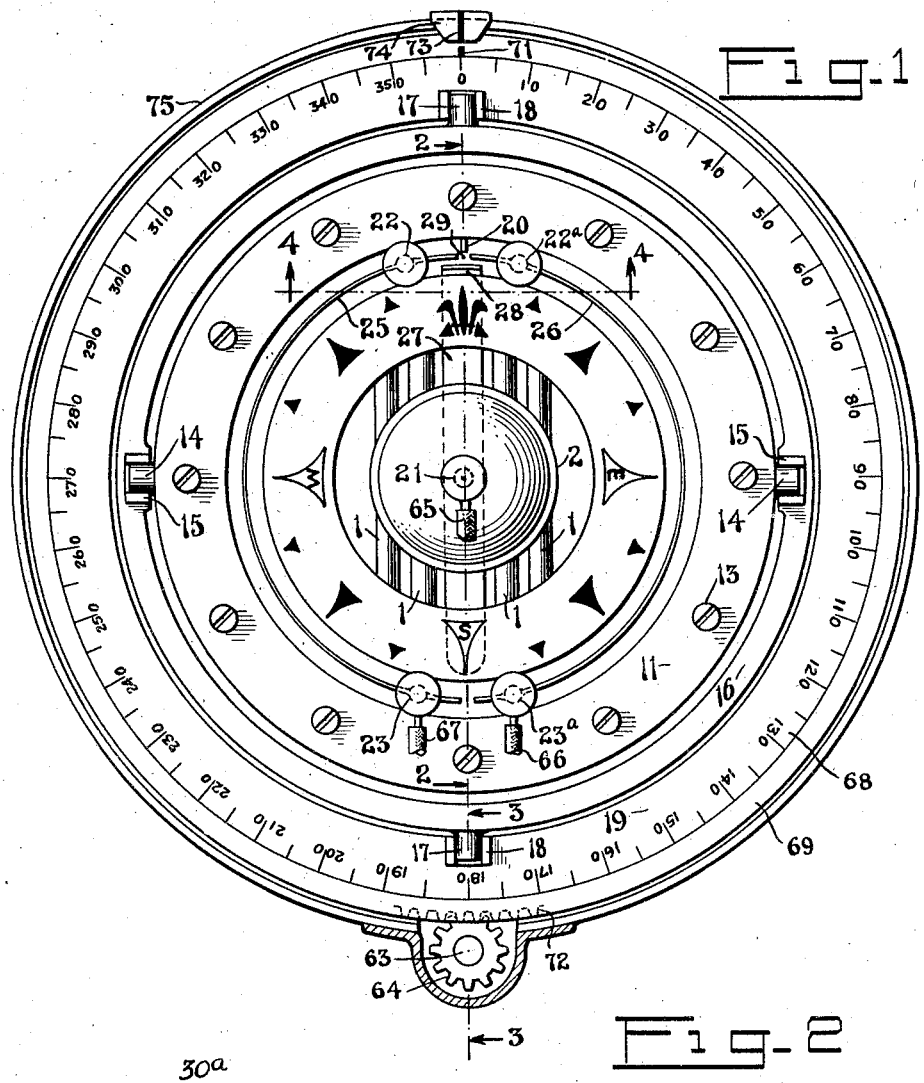
Humphrey F. Parker
INVENTOR
BY John J. Rogan
ATTORNEY

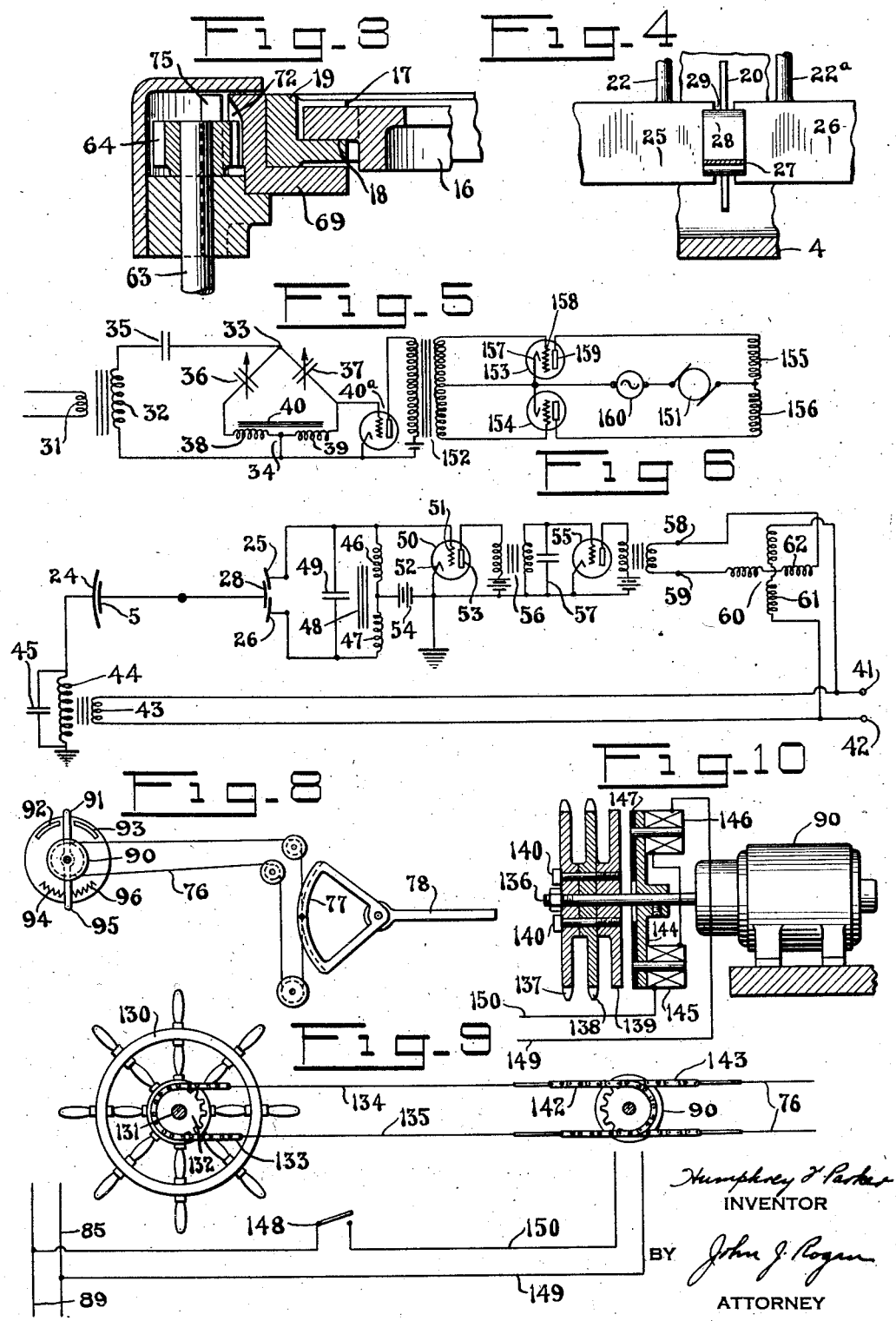

Patented Nov. 3, 1936

2,059,271

UNITED STATES PATENT OFFICE 2,059,271

CONTROL SYSTEM AND APPARATUS

Humphrey F. Parker, New York, N. Y.

Application May 13, 1933, Serial No. 670,855

26 Claims. (Cl. 172—282)

This invention relates to control systems and with particularity to an improved form of automatic control system.

The invention has for its principal object to provide a novel form of control, suitable for use in automatic steering, or in any field where the heading and/or position of an object are to be indicated and/or controlled.

Another object of the invention relates to a heading and/or position indicator or the like, which has a maximum sensitivity and accuracy. In carrying out this object of the invention it is proposed to employ an extremely sensitive movable master control device which exercises its control without physical contact with the devices to be controlled.

Another object of the invention relates to a heading and/or position indicator or the like in which a member, receiving electrical impulses from a relatively movable point, uses such impulses to transmit signals to another relatively movable point without physical contact between the various parts of the system.

Another object of the invention resides in an improved form of master control device which is capable of controlling, with maximum accuracy, one or more repeater devices, such as position indicators, clocks, compasses, etc.

Another object is to provide a novel mechanism for controlling "follow-up" devices such as employed in automatic steering systems or the like.

A feature of the invention relates to an improved form of master compass.

Another feature relates to the novel mechanism for controlling the heading or direction of a moving craft.

A further feature relates to a novel method of electrically coupling a master compass, a direction indicator, or similar device to a repeating system.

A still further feature relates to a simple, accurate and reliable master control device which operates by space induction to control one or more repeaters.

Other features and advantages not specifically enumerated will be apparent after a consideration of the following detailed description and the appended claims.

While the invention will be described herein as embodied in specific forms and organizations of apparatus, it is understood that this is done for purposes of explanation and not by way of limitation.

Accordingly, Fig. 1 is a plan view, partly in section, of a master compass embodying features of the invention;

Fig. 2 is a partial sectional view of Fig. 1, taken along the line 2—2 thereof;

Fig. 3 is an enlarged detailed sectional view of one of the compass supports and the mechanism for rotating said supports taken on the line 3—3 of Fig. 1;

Fig. 4 is a detailed enlarged view of certain of the control mechanism of the compass taken on the line 4—4 of Fig. 1;

Fig. 5 is a schematic diagram explanatory of certain features of the invention;

Fig. 6 is a detailed schematic diagram of a preferred form of electrical system for carrying out the invention;

Fig. 8 is a detailed schematic diagram of one manner of controlling the rudder or other direction control device of a ship or other craft;

Fig. 9 shows how the steering system according to the invention may operate either under manual control or automatic control;

Fig. 10 is a detailed view of certain of the mechanism of Fig. 9; and

Figure 7:
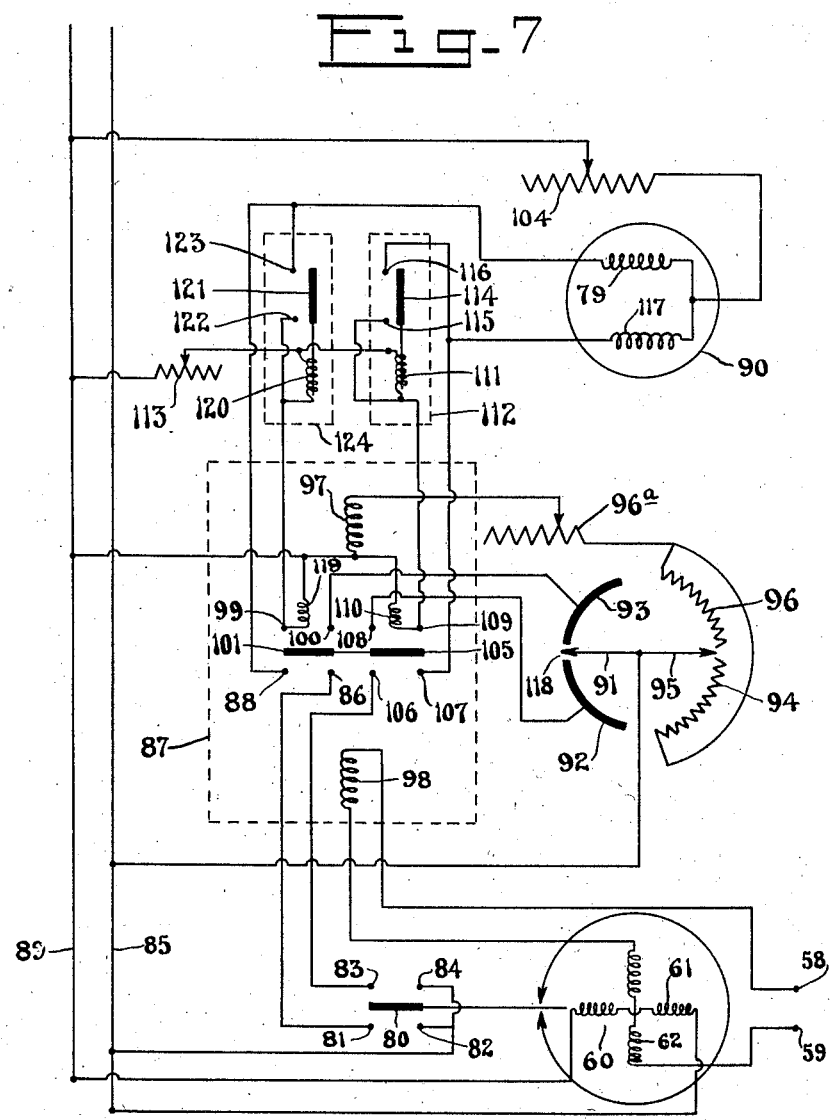
Fig. 7 is a detailed schematic diagram of a preferred form of electrical system for the follow-up mechanism for controlling the heading of a ship or other craft.

Referring more particularly to Figs. 1 and 2, there is shown a preferred type of master control device in the compass that may be used in carrying out the invention. This compass consists of a group of permanent magnets formed of a number of magnetized hardened steel needles packed together and sealed in tubes 1 of brass or other non-magnetic material and with all the north-seeking poles facing the same way within the tubes. The tubes 1 are fastened in any suitable manner, for example by soldering, to a hollow float 2 of non-magnetic material such as brass or other metal, the shape and size of the float being preferably such as to provide sufficient buoyancy to allow the float and magnet assembly to barely sink in the liquid 3 within the bowl 4. The liquid 3 is preferably a non-conductor in the form of a non-viscous transparent oil such as a light transformer oil or the like.

As shown in the drawings, the float comprises a substantially hemispherical portion 5 and a disc portion 6. The float assembly also carries a compass card 7 of mica or other similar material, the upper surface of which is provided with the usual compass markings or other directional markings.

Centrally carried by the float portion 6 is a jewelled bearing 8 which rests upon a polished pivot 9 adjustably mounted in the base of bowl 4. The liquid 3 within the bowl is preferably hermetically sealed by a plate glass cover 10, this cover being held fast in place in an annular ring 11 which in turn is fastened to the flanged rim 12 of the bowl by suitable screws 13.

Bowl 4 is provided with trunnions 14 which rest in trunnion bearings 15 in gimbal ring 16. Ring 16 is in turn provided with diametrically disposed trunnions 17 located on a diameter normal to that on which the trunnions 14 are located. Trunnions 17, instead of being supported in the usual fixed binnacle, are, as shown in Figs. 1 and 3, provided with bearings 18 carried in a rotatable ring 19 for purposes described hereinbelow. The wall of bowl 4 is provided with a reference or lubber line 20, the relationship of which with respect to the markings on the compass card 7, indicates the heading of the ship or other craft in which the device is installed. In other words, the compass card, apart from parasitic disturbances, remains in fixed azimuth by reason of the natural attraction between the earth's magnet and the compass needles, while the lubber line 20 being fast to the ship, moves in relation to the card 7 as the ship's direction is changed.

One of the important practical features of this invention is the mechanism for maintaining the lubber line 20 in alignment or in any other fixed relation with a selected marking on the compass card. For this purpose it is necessary to provide follow-up mechanism by means of which an incipient departure of the compass support from its preselected normal or neutral position, causes the said support to reassume its normal or neutral position. This follow-up motion may be provided by a suitable reversible motor which may be controlled as to direction and duration of rotation by electrical signals controlled by the compass. Various methods of producing and utilizing these signals have been proposed heretofore, probably the simplest being a contact arm carried by the compass float, current being provided to this arm through the compass pivot. A pair of fixed contacts are then disposed at either side of the lubber line. When the float contact arm is midway between the fixed contacts, the follow-up motor will not act to vary the position of the compass bowl or support. A departure would, however, cause the float contact to engage physically one or the other of the fixed contacts, depending on the direction of the departure, resulting in corresponding rotation of the follow-up motor. This arrangement has the very serious disadvantage that the directive force exerted on the float by the earth's magnetic field is so small as to be incapable of physically closing a contact with any degree of reliability or uniformity. In addition, the passage of the control current through the pivot tends to electrolyze and eventually destroy the pivot point. It has been proposed heretofore to employ a liquid electrolyte and to rely upon the variations of resistance between the fixed and movable contacts resulting from a departure, but here again unless extreme precautions are taken, the eletrolyte in time deteriorates the contacts and changes their resistance. The resistance of the electrolyte itself may also change because of its contact with various metal parts within the bowl. The above disadvantages are overcome and a thoroughly reliable and accurate instrument is provided in accordance with the present invention by eliminating any physical or rubbing connection between the fixed and movable contacts, or without relying upon variations of resistance of the electrolytic bath or the like.

In accordance with this particular phase of the invention, the control signals are transferred from the fixed to the movable parts of the compass solely by space induction, electrostatic induction, or electromagnetic induction, or a combination of electrostatic and electromagnetic induction.

In order to complete the control circuits, the plate glass cover 10 carries five terminals or binding posts 21, 22, 22ᵃ, 23, 23ᵃ. The post 21 carries at its lower end a hemispherically shaped metal member 24 preferably of brass or other non-magnetic material. The member 24 is preferably so disposed that the center of its spherical curvature lies as closely as possible at the point of the pivot 9. Since, as above described, the float section 5 is also hemispherical, there is a uniform spacing between the member 24 and the float section 5. Consequently, any electric potential impressed upon the member 24 produces uniform electrostatic fields between the said members and the lines of force are symmetrical with respect to the pivot point 9. Since the liquid 3 is preferably a non-conductor, members 24 and 5 constitute in effect a condenser. Consequently, if a potential is impressed upon the member 24 a corresponding potential will be electrostatically induced upon the member 5, the induced potential being a function of the opposed areas between the members 5 and 24 and the dielectric constant of the liquid 3. The posts 22 and 23 carry a semi-circular metal ring 25, and a similar semi-circular metal ring 26 is carried by the posts 22ᵃ and 23ᵃ. As shown more clearly in Fig. 1, the rings 25 and 26 are spaced apart at their opposing ends. Preferably, each of the rings 25, 26 is formed to the shape of a spherical sector and the rings are disposed concentrically with relation to the pivot 9. The float portion 6 has attached thereto a metallic arm 27 which terminates in a plate 28 conforming in curvature to the curvature of the rings 25 and 26 so as to be uniformly spaced therefrom at all points. As indicated clearly in Fig. 2 of the drawings, each of the posts 21, 22, 22ᵃ, 23, 23ᵃ, is rigidly held in position in the glass top 10 by a bushing 29ᵃ and nut 30ᵃ. With this arrangement therefore, the members 5, 24, 25, 26, 28 are symmetrically and/or concentrically mounted with relation to the pivot 9. With the above described arrangement, therefore, the compass float may move in planes at an angle to the normal plane of the compass rotation without disturbing the proper operation of the system, since such movements do not change the radial spacing between the members 25, 26 and 28.

Normally, the member 28 is in registry with the gap 29 between the ends of the ring members 25 and 26 with an equal extent of overlap between the said member 28 and the ends of the rings. Consequently, if a potential is impressed upon the member 24, corresponding potentials of equal magnitude are induced upon the rings 25 and 26, resulting from the fact that the member 28 forms with the said rings a pair of variable condensers, the member 28 being the movable plate and the members 25 and 26 being the fixed plates. If, however, the member 28 should overlap one of the rings to a greater extent than the other, then unequal potentials will be induced in the rings.

This differential potential may then be utilized, in the manner to be described, to control the follow-up mechanism, the direction of rotation being determined by the position of the member 28 with respect to the rings 25 and 26. From the foregoing it will be seen, therefore, that the differential potential is controlled by the compass float and this differential potential may be taken off the binding posts 22, 22ª or 23, 23ª without any physical contact between the compass float and the stationary collector rings 25, 26.

Referring to Fig. 5 there is shown, for explanatory purposes, an electrical circuit that may be used in conjunction with the device of Figs. 1 and 2. In Fig. 5, if an alternating current of suitable frequency is applied to the primary winding 31 of a step-up transformer, an electromotive force of high potential but low power is induced in the secondary winding 32. The secondary winding 32 has its ends connected across the points 33 and 34 of an alternating current balancing network, this connection being preferably effected through a condenser 35 of fixed capacity. The two upper arms of the balancing network are formed of the variable condensers 36, 37, while the two lower arms of the network are composed of the windings 38, 39 of the auto-transformer 40. If the windings 38 and 39 are electrically balanced, then for a given potential impressed at the point 33, the resultant E. M. F. across the total windings 38 and 39 will be zero provided the capacities 36, 37 are of equal magnitude. If, on the other hand, one of the capacities 36 or 37 is increased in magnitude or the other capacity is decreased, then the opposing E. M. F.'s induced in the windings 38 and 39 will be unequal and a measurable differential E. M. F. will be developed across the total winding of the transformer 40. By means of a suitable electron discharge amplifier 40ª this differential E. M. F. is amplified and used to control the follow-up motor in the manner described hereinbelow.

For example, Fig. 5 shows schematically one manner of employing the amplified E. M. F.'s to control the direction of rotation of a reversible motor having an armature 151. As indicated in this drawing, the currents in the secondary winding 152 are applied across a pair of devices 153, 154. These latter devices are preferably of the type which pass current or relay current only for a given polarity of potential impressed thereon. For example, they may take the form of oppositely poled vacuum tubes, so-called Thyratrons, or even oppositely poled rectifiers. The outputs of these devices 153, 154 are connected to the field windings 155, 156 associated with the armature 151. As schematically illustrated in Fig. 5, the devices 153, 154 are of the three-electrode type, each having an emitter cathode 157, a control electrode 158 and an anode 159. The anode or output current may be supplied from a suitable source such as an alternator 160 in series with the armature 151 and thence through the field windings 155, 156 in the manner well understood in the vacuum tube or Thyratron art. For a given polarity of current in the secondary winding 152 the device 153, for example, will allow current to pass through the field winding 155, whereas for a current of the opposite polarity in the winding 152, the device 154 functions to allow current to flow through the field winding 156. By means of the separate windings 155, 156 therefore, the direction of rotation of the armature 151 may be controlled.

Referring to Fig. 6, there is shown a complete electrical system based on the electrical principles illustrated in Fig. 5 for utilizing the device of Figs. 1 and 2 to control the direction of rotation of the follow-up motor. In Fig. 6 a suitable source of potential, for example, a 60-cycle source, is impressed upon the terminals 41, 42 and upon the primary winding 43 of a step-up transformer. The high potential end of the transformer secondary 44 is connected to the member 24 corresponding to the member 24 of Figs. 1 and 2. Preferably, the low potential end of the secondary winding may be grounded as shown and, if desired, a condenser 45 may be connected across this winding. The arm 28 of the device of Fig. 2 is represented by the same numeral in Fig. 6, and the collector rings 25, 26 are likewise designated by the same numerals in Fig. 6. Preferably, the transformer is designed to produce a relatively high voltage in the secondary, for example, of the order of 2000 v. The collector rings 25 and 26 are connected across the winding sections 46 and 47 of an auto-transformer 48 corresponding to the transformer 40 of Fig. 5. Preferably, the auto-transformer 48 is shunted by a condenser 49 for tuning the amplifier to the frequency of the current from terminals 41 and 42 and also for increasing the input impedance to the amplifier tube 50. The tube 50 may consist of any well known form of electron discharge tube having a control grid 51, an electron emitting cathode 52 and an anode 53. Preferably, the cathode 52 is grounded and is connected to the electrical midpoint of the winding sections 46 and 47 through a biasing potential 54, whereby the tube 50 may be biased to work on the proper portion of its characteristic curve. A succeeding amplifier stage or stages 55 may be provided, preferably with the interstage coupling transformers 56 and may be tuned by an associated condenser 57 to the line frequency, although it will be understood that the system is entirely operative without employing tuned amplifiers. The amplified output is delivered to the terminals 58 and 59 whence it may be utilized to drive any suitable form of follow-up control mechanism. Thus as illustrated in Fig. 6, the follow-up control mechanism comprises a dynamometer 60 having one of its coils 61 connected across the line terminals 41, 42 and its other coil 62 connected across the amplifier terminals 58 and 59. The direction of torque developed in the dynamometer 60 will then be a function of the direction of current flow of the amplified output across terminals 58 and 59. This direction is in turn dependent upon the position of the movable member 28 with respect to the collector rings 25 and 26. In other words, if the member 28 is symmetrically disposed with relation to the rings 25 and 26 so as to overlap them equally, there will be no differential E. M. F. produced across the transformer 48 and consequently the dynamometer shaft will remain in its neutral or normal position. On the other hand, should the member 28 move towards the ring 25 and away from the ring 26, there will be produced a differential E. M. F. which, upon being amplified, will cause the rotation of the dynamometer shaft in one direction. If, however, the member 28 should move towards the ring 26 and away from the ring 25, then the dynamometer shaft will rotate in the opposite direction.

As described hereinabove, the alternating potential developed in the secondary winding 44 induces corresponding potentials on the member 5 and on the members 25 and 26, the magnitude of the induced charges on these latter two members being determined by the movable member 28, which in turn is controlled by the position of the compass, it being directly connected thereto as described above in connection with Figs. 1 and 2.

It is assumed that the phases of the currents in the dynamometer coils 61 or 62 are either the same or are displaced 180° apart, and in order to achieve this condition suitable phase correcting means or circuits may be employed in the amplifier itself or between the amplifier and the dynamometer. From the description given above in connection with Fig. 2, it will be noted that since the compass float assembly is supported by a jewelled bearing 8, this assembly is electrically insulated from ground and from the bowl 4. However, if desired, additional screening or electrostatic "guard-rings" may be employed to prevent parasitic disturbances from affecting the needle and from affecting the induced potentials on the rings 25 and 26. The system of Fig. 6, therefore, provides an arrangement whereby the movements of the compass needle cause the production of corresponding differential E. M. F.'s which are amplified, and the polarity of the differential E. M. F.'s is utilized to control the direction of rotation of the follow-up control dynamometer.

It will be understood, of course, that the invention is not limited to any particular frequency of alternating current and, as a matter of fact, a source of direct current may be connected to the terminal 21, providing suitable resistance leaks are incorporated for leaking off the charge from the rings 25 and 26 at a predetermined rate. If the line current is a direct current then, if desired, a suitable form of D. C.—A. C. converter may be employed between the line and the terminal 21. It will be understood, of course, that if a sufficiently high-powered amplifier is employed, the dynamometer 60 may be replaced by any well-known form of reversible motor which begins to rotate only when current flows across the terminals 58 and 59. For example, the dynamometer 60 may be replaced by a series type A. C. motor which has its armature fed with current from the terminals 41 and 42 through a resistance or impedance. Such a motor will rotate only when the field is energized from the amplifier terminals 58 and 59 and then only in the direction determined by the phase of the amplified voltage, which in turn is controlled by the angular displacement of the compass needle. Preferably, however, when the system of Fig. 6 is to be used for controlling the compass bowl 4 or other device, the shaft of the dynamometer 60 may be utilized to close selectively suitable relay contacts which in turn control the supply of current to the coils of a reversible motor or a reversible clutch in conjunction with a continuously running motor.

As explained hereinabove, the compass float, except for parasitic disturbances, always remains fixed in azimuth, but its support, including the bowl 4, moves according to the yawing of the ship, and suitable follow-up mechanism may act upon an incipient movement of the bowl or support to restore it to its normal or neutral relationship with respect to the float. Thus the shaft or rotor of the dynamometer (Fig. 6), or the rotor of a reversible motor, may be connected through suitable gearing to shaft 63 and gear 64 (Figs. 1 and 3). This coupling between the dynamometer or motor and the compass gear 64 may be effected through a flexible shaft (not shown), thus removing all the control mechanism from the neighborhood of the compass proper, requiring in addition to the flexible shaft, only a single cable carrying conductors 65, 66, 67.

As described hereinabove in connection with Fig. 1, the trunnions 17 of the gimbal ring 16 are supported in bearings 18 in the rotatable ring 19. The ring 19 carries a scale 68 suitably marked or engraved in degrees or compass points on its outer portion and is mounted in a guide ring 69 (Fig. 3). In the normal or neutral position of the mechanism the ring 19 and the ring 69 are in predetermined relation to each other; for example, with the north or zero point of the scale 68 opposite the reference line 71 on the ring 69. Ring 69 carries a circular rack 72 which meshes with pinion gear 64 driven by the follow-up motor or dynamometer. The motor in turning, rotates the support ring 19, the gimbal ring 16 and the bowl 4, causing the scale 68 to remain fixed in azimuth. The heading of the ship is then shown by the relationship of the scale 68 to the reference line 73 on the plate 74, which plate is attached to the binnacle ring 75 fixed to the structure of the ship.

When the device is to be used for automatic steering, the reversible motor or dynamometer 60 (Fig. 6) is disconnected from shaft 63 and connected through suitable coupling mechanisms, such as a cable 76 illustrated schematically in Fig. 8, to the rudder. The rotation of the follow-up motor will then apply a pull to the cable 76 (Fig. 8) which is attached to the rudder quadrant 77, causing the rudder 78 to be moved in the proper direction for controlling the direction of movement of the craft. The rudder thus controlled acts to restore the craft and the compass bowl 4 to its normal or neutral position since the corrective movement is applied to the bowl indirectly through the rudder, the bowl and ship being in fixed relation. The ship or craft being in motion is therefore held to a constant heading or direction.

The mechanism is so designed as to provide for any selection of course to be steered. This selection is effected by manually rotating the compass bowl and the ring 19 until the desired course, indicated on scale 68, is in registry with the reference line 73. Under this condition, temporarily the float arm 28 is out of alignment with the gap 29, but the follow-up mechanism rapidly restores this arm to its proper position as above described and, in doing so, brings the ship onto the chosen course, to which it will be held thereafter by the same mechanism.

In steering a craft which is off course, it is well known that as increasing rudder control is applied to restore the craft to its desired course, the inertia of the craft will cause it to overswing, and when rudder control is applied in the opposite direction to correct this overswing, there will be an overswing in the opposite direction, resulting in a continuous hunting movement of the craft from side to side.

A control system for reducing this hunting to a minimum is shown schematically in Fig. 7. In general, the method comprises the application of helm in an amount proportional to the departure, and when the proper amount of helm has been applied, to reduce it steadily until the rudder is returned to its amidships position. The foregoing cycle is repeated with the helm being applied in decreasing amounts and in the proper direction to the extent required by the departure under consideration. By this method the yawing of the ship is held to a reasonable minimum and overswing is substantially prevented.

Referring to Fig. 7, the numerals 58 and 59 represent the output terminals of a system similar to that of Fig. 6, i. e., wherein the amplitude, direction, and phase of the currents, is determined by the relation between the compass and the compass bowl. These amplified control signals are impressed upon the winding 62 of the dynamometer control relay 60 in series with the winding 98 of a differential relay 87 described hereinafter. Depending upon the position of the member 28 with respect to the members 25 and 26, the dynamometer will operate the contact bar 80 to bridge either the contact 81 or 82 or the contacts 83, 84, it being understood that the other winding 61 of the dynamometer is energized directly from the mains 85 and 89. Assuming that the member 28 is in such a position that the contacts 81 and 82 are bridged, then a circuit may be traced from the main 85, contacts 82, 81, contacts 86, 88 of the differential relay 87, through the winding 79 of the reversible motor 90, adjustable resistance 104, to the other main 89. The relay 87 is preferably designed so that the contact bars 101 and 105 normally bridge the corresponding fixed contact sets 86—88 and 106—107, it being understood that a suitable biasing mechanism such as a light spring or a gravity control may be used for this purpose. The differential relay is provided with two differentially wound coils 97 and 98 which are so designed that the coil 97 acts to move the contact bars 101, 105 towards the top only when the energization of the winding 97 exceeds that of the winding 98. Assuming that the energization of the winding 97 does not exceed that of winding 98, then the winding 79 causes the motor 90 to rotate, for example, in a counter-clockwise direction and thus correspondingly moves the rudder to restore the craft to its proper heading. Suitably coupled to the shaft of motor 90 are brushes 91 and 95, brush 91 having associated therewith a pair of spaced commutator segments 92 and 93, while the brush 95 has associated therewith two resistor sections 94 and 96. Thus, as the motor 90 rotates to control the rudder, for example, by means of the cable 76 (Fig. 8), the brushes 91 and 95 are correspondingly rotated. Consequently, the brush 95 in rotating in a counter-clockwise direction, gradually increases the current flowing through the winding 97 of the differential relay 87, through the adjustable resistance 96ª. Since the other coil 98 of the differential relay is energized by the amplified control currents from the terminals 58 and 59, the energization of this winding 98 is proportional to the differential E. M. F. induced on the members 25 and 26 as above described, the differential E. M. F. being zero when the member 28 is midway between members 25 and 26, and maximum when the said member 28 is wholly covered by one or the other of the members 25 or 26. The current passing through coil 98 is therefore substantially proportional to the departure of the ship from its proper heading. However, as above described, the gradual increase of current through the coil 97 finally causes the said winding to take control of the differential relay and move the bars 101 and 105 towards the top to bridge the contacts 99—100 and 108—109.

When the contacts 108—109 are thus bridged, a holding circuit is created for the differential relay, this circuit being traceable from the main 85, brush 91, segment 92, contacts 108, 109, holding coil 110, back to the main 89. The armature 105 is thereby held in its upper position, maintaining closed the gap between contacts 108 and 109. In parallel with the holding coil 110 is a heating coil 111 for the thermostatic time delay switch 112.

When winding 97 overcomes winding 98 and armature 105 is lifted into contact with contacts 108, 109, the circuit between contacts 86 and 88 is broken and current ceases to flow to the winding 79 of the motor 90, which thereupon slows down and stops. At this stage a predetermined amount of rudder has been applied, but the ship is still off her course. For a short time interval, until the current passing through the heating coil 111 causes the contact bar 114 to close the gaps 115, 116, the rudder remains in the "on" position, thereby checking the yaw or causing the vessel to commence its movement back to its course. Upon this gap 115—116 being closed, current is enabled to flow from contact 109 to contact 115, thence through contact bar 114 to contact 116, to winding 117 of the motor 90, to adjustable resistance 104, back to the main 89.

The motor now rotates in the opposite direction to that due to the energization of winding 79, and as a result the rudder is moved back towards its amidships position. When this position is attained the brush 91 registers with the gap 118, breaking the circuit to the holding coil 110. The circuits to the thermostatic winding 111 and to the motor winding 117 are also broken with the result that the motor stops. Armature 105 falls away from contacts 108, 109 and armature 101 bridges the gap 86, 88.

This completes a cycle of operations, the effect of which is to check the yaw of the vessel, but not necessarily to bring it back exactly to its course coincidentally with the return of the rudder to its amidships position. Normally, after completing this cycle, the heading of the ship will be closer to the proper course than at the commencement of the cycle, but there will still be a small departure in the same direction as at the start. If this should be the case the contacts 81 and 82 will still be bridged by the armature 80 and current will again flow to winding 79 of the motor applying rudder in the same direction as the previous cycle. The amount of departure of the ship from its course now being small, the differential E. M. F. between members 25 and 26 will be small and the amplified current flowing through winding 98 of differential relay 87 will likewise be small. As a consequence it will be necessary for brush 95 to move a smaller distance over resistance 96 than in the previous cycle and only a small amount of rudder will be applied by the time the armature 101 moves away from contacts 86—88 and stops the motor. The remainder of the cycle is repeated as before and this time it is probable that the vessel is so close to its course that the differential E. M. F. generated between plates 25 and 26, after amplification, will be insufficient to move the armature 80 far enough away from its neutral position to bridge either of the gaps 81—82 or 83—84.

When the vessel departs from the course in the opposite direction enough to cause contact bar 80 to bridge the gap 83—84, current is enabled to flow from the main 85 to contact 84, through contact bar 80 to contact 83, thence to contact 106, through armature 105 to contact 107, to motor winding 117, resistance 104, and back to the main 89.

As the motor turns to apply rudder it moves brush 95 on to resistance 94 and as this resistance diminishes the flow of current through the winding 97 of the differential relay 87 is increased. When the energization of this winding exceeds that of winding 98, the armature 101 closes the gap between contacts 99 and 100 and armature 105 opens the gap between contacts 106 and 107. The opening of the latter gap breaks the circuit to the motor winding 117 so that the motor stops.

Current flows from main 85 through brush 91 and conductor segment 93 to the contact 100, armature 101, and contact 99. From contact 99 there are three branches leading back to main 89.

The first branch energizes the holding coil 119 and maintains the armature 101 in contact with contacts 99 and 100; the second branch energizes the heating coil 120 of the thermostatic switch 124, which after a predetermined short time interval causes member 121 to bridge the gap between contacts 122 and 123; the third branch provides a circuit from contact 99, to contact 122, contact bar 121, contact 123 to motor winding 75 and thence by resistance 104 back to main 89.

The motor is thus rotated in the opposite direction and acts to return the rudder to the amidships position; it also moves the brush over the segment 93 towards the gap 118. Upon this gap being reached the circuit is broken, the holding coil 119 is released and the motor stops, again completing a cycle.

In automatic steering systems it is important that at any time, for example in emergency, the automatic system may be cut out instantly and completely, and full manual control restored to the helmsman. A method of accomplishing this is shown in Figs. 9 and 10, in which the numeral 130 designates a wheel for hand steering. This wheel rotates about the shaft 131, and carries the sprocket 132 which engages the chain 133 of sufficient length to permit of putting the rudder over to its limiting position. The ends of this chain are attached to cables 134, 135, which are led over suitable pulleys (not shown) to the location of the steering motor 90. This motor, through suitable reduction gearing, drives the shaft 136. On shaft 136 are loosely mounted the two sprockets 137, 138, which are pinned together and to the disc 139 by the studs 140. Engaging the teeth of one of these sprockets is the chain 142, and engaging the teeth of the other sprocket is the chain 143. The ends of chain 142 are attached to the free ends of the cables 134 and 135 leading to the hand steering wheel, while the ends of chain 143 are attached to cable 76 which in turn is attached to the rudder quadrant 77. It is apparent that with the sprockets 137 and 138 fixed together and idling on shaft 136, the wheel 130 moves the quadrant and the rudder in the manner customary with hand steering, without any interference whatever from the presence of the automatic mechanism.

Keyed to shaft 136 of motor 90 is the plate 144 on which are mounted the electromagnets 145 and 146. The disc 139 is of iron or other suitable magnetic material. When the electromagnets 145, 146 are energized therefore, they exert an attraction for the iron of disc 139 and draw this disc towards the plate 144 which carries a facing 147 of cork or other friction material. As a result disc 139 and sprockets 137 and 138 are temporarily locked to the plate 144 and shaft 136, and are caused to rotate when the motor rotates, thereby moving the rudder in accordance with the automatic signals impressed upon the motor circuit and incidentally turning the hand wheel 130.

The manual switch 148 is located in proximity to the steering wheel 130. When this switch is closed current is permitted to flow from the mains 85, 89, through conductors 149, 150 to the windings of the electromagnets 145, 146, energizing these windings and bringing into operation the automatic steering system. The opening of this switch cuts out the automatic system and restores the wheel 130 to use for hand steering. It will be understood, of course, that any suitable form of clutch may be employed to bring together the fixed and free units on shaft 136, for example, the friction clutch may be replaced by a dog clutch, and operation may be by Bowden wire or cable, manually controlled from the steering wheel position.

The response of a craft to the action of its rudder varies for a number of reasons, depending on the size of the rudder, the speed of the craft, the inertia of the craft, and the effect of weather and sea conditions. It is necessary to provide means for giving a correct initial setting to the amount of rudder applied for given departures of the craft from the course, and it is also desirable, in certain cases, to provide means for changing the rudder response under changing sea and weather conditions. In the present invention three adjustments are provided in the variable resistances 96ª, 104 and 113.

Resistance 96ª is in circuit with coil 97, so that by adjustment of 96ª the amount of angular movement of brush 95 necessary to overcome coil 98 may be increased or decreased. Thus the amount of helm for a given departure from the selected course may readily be adjusted. Normally, this resistance will be set at a suitable value, found by trial and error, and will be fixed there, although provision may be made to change the resistance to apply more or less rudder for a given departure if and when this should be considered desirable.

Resistance 113 controls the period of time during which the rudder remains in the "on" position, an increase in the resistance delaying the heating of the thermostatic windings 111 and 120 and thus delaying the closing of the circuit for operating the motor to remove rudder. This also is normally set as a matter of initial adjustment, and then fixed in the set position, but as in the case of resistance 96ª, manual means may be provided for adjustment to weather conditions, should this be desired.

Figure 11:
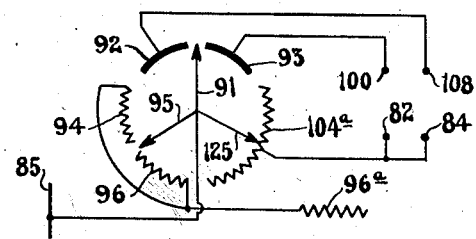
Fig. 11 is a schematic diagram of a modification of part of the system shown in Fig. 7.

In the case of large crafts, the amount of hunting may be reduced by applying the corrective rudder more slowly as the amount of helm is increased. For example, from its amidships position of the rudder during its initial movement, the rate may be predetermined, and then as more and more helm is applied, the rate of application of the rudder may be slowed down. This may be accomplished by employing a variable speed motor. Thus the motor 90 may be of the variable speed type and the resistance 104 may be designed so that as the motor begins to rotate, this resistance has a relatively low value. As the motor continues to rotate, the amount of series resistance 104 may be correspondingly automatically increased, thus reducing the E. M. F. at the motor coils and correspondingly reducing the speed of the motor and application of the rudder. A method of accomplishing this is schematically illustrated in Fig. 11. In Fig. 11 the shaft carrying brushes 91 and 95 is provided with an additional brush 125. The support for the commutator segments 92, 93 and resistance elements 94, 96 also carries a resistance 104ᵃ which cooperates with brush 125. Resistance 104ᵃ corresponds in certain functions to resistance 104 of Fig. 7. However, in Fig. 11 resistance 104ᵃ is adapted to be connected between the contacts 82, 84 of relay 60, and main 85, rather than between motor 90 and main 89, as in Fig. 7. In the embodiment of Fig. 7 therefore, the resistance 104 will vary the rate of application of rudder both during its "on" and during its "off" motion, whereas with the arrangement of Fig. 11, the rate of application of rudder is controlled by resistance 104ᵃ only during the "on" movement of the rudder.

While the invention has been described above with reference to a ship, vessel, or craft, it is understood that these are merely illustrative fields of application. For example, the invention may be used on any kind of moving vehicle whose direction or orientation with respect to a selected heading may be gauged and/or automatically controlled. The term "departure control," therefore, as employed in the specification and claims, refers to any type of system wherein the position of one member is to be controlled with respect to another member. Similarly, the term "overlapping" as employed herein to describe the relation between members 25, 26 and 28, is intended to cover not only a physical overlap, but any other equivalent overlap. For example, the gap 29 may be wider than the member 28, so long as relative movement between member 28 and members 25, 26 results in the induction of corresponding E. M. F.'s. Similarly, instead of disposing members 25, 26 adjacent each other, they may be disposed on opposite diameters and the compass float may be provided with a pair of diametrically disposed collector members to induce corresponding E. M. F.'s on the fixed members.

What I claim is:

1. The method of steering which comprises creating an E. M. F. proportional to the departure of a craft from a chosen heading, creating a second E. M. F. proportional to the departure of the rudder from its neutral position, applying rudder until said second E. M. F. bears a predetermined magnitude relation to said first E. M. F., and then restoring said rudder directly to its neutral position.

2. In automatic steering apparatus, a compass, a rudder means for selecting the direction of rudder application to correct for the departure of a craft from its course in accordance with the direction of said departure, differentially balanced means responsive to the movements of said compass and said rudder for regulating the application of said rudder in an amount proportional to said departure, and means for steadily removing said rudder application independently of said balancing means.

3. Automatic steering mechanism comprising means for selecting the direction of rudder application, means for applying said rudder, means for creating an E. M. F. proportional to the departure of a craft from its chosen heading, means for creating a second E. M. F. proportional to the movement of said rudder-applying means from a predetermined neutral position, means for comparing said E. M. F.'s to stop said rudder applying means and to restore the rudder-applying means to neutral position.

4. In a system for controlling a steering member or the like, a source of steering control currents proportionate to the extent to which said member is to be moved, a motor for moving said member, a motor control relay, a member driven by said motor for producing another current independent of the control current, means for differentially applying said currents to said control relay, means controlled by said relay for stopping the steering member at a position determined by said control currents, and means effective after the stopping of the steering member for automatically reversing the direction of movement of said member until said member resumes its neutral position.

5. In a system for controlling a steering rudder or the like, means for producing steering control current corresponding to the extent to which said rudder is to be moved, a device responsive to the polarity of said current, a motor for moving said rudder, means controlled by said motor for producing another current whose instantaneous amplitude corresponds to the off-neutral position of said rudder, means responsive to a predetermined amplitude relation between said two currents to effect stopping of said rudder, and means automatically effective upon stopping of said rudder to restore said rudder to neutral position.

6. In a system for controlling a steering rudder or the like, means for creating an E. M. F. proportionate to the extent to which said rudder is to be moved away from neutral position, means for creating another E. M. F. varying instantaneously in accordance with the position of said rudder from neutral, means for continuing the off-neutral movement of said rudder until said currents bear a predetermined magnitude relation, and means automatically responsive to the attainment of said relation for causing said rudder to move back to its neutral position.

7. In a system for controlling a steering rudder or the like, means for creating an E. M. F. proportionate to the extent to which said rudder is to be moved away from neutral position, means for creating another E. M. F. varying instantaneously in accordance with the position of said rudder from neutral, means for continuing the off-neutral movement of said rudder until said currents bear a predetermined magnitude relation, means automatically responsive to the attainment of said relation for causing said rudder to move back to its neutral position, and means for causing the foregoing operations to be repeated in successively decreasing rudder movements.

8. In a departure-control system, a steering rudder or the like, a source of steering control current, means to apply said current to move said rudder to an off-neutral position determined by and in proportion to the departure, means for automatically returning said rudder to its neutral position, and means independent of the control current for delaying the initiation of the return movement of said rudder.

9. In a system for controlling a steering rudder or the like, a source of steering control current, a motor for said rudder, means controlled by said motor for producing another current, a differential device controlled by both said currents, a time delay device controlled by said differential device, the supply of current to said motor for applying said rudder being controlled by said differential device, and the supply of current to said motor for removing said rudder being controlled by said time-delay device.

10. In a system for controlling a steering rudder or the like, a motor for operating the rudder; a source of steering control E. M. F., a polarized relay device controlled by said E. M. F., means controlled by said motor for producing another E. M. F., a device controlled differentially by said E. M. F.'s, a time delay device controlled by said differentially controlled device, and a control circuit for said motor, adapted to start said motor under control of said polarized relay device, to stop said motor under control of said differentially controlled device, to reverse said motor under control of said time delay device and to finally stop said motor under control of said motor controlled means.

11. In a departure control system, a rudder or similar steering mechanism, compass controlled means for oscillating the rudder between neutral and an angular position determined by said departure, means for controlling the amplitude and rate of oscillation of the rudder, and means for independently controlling the period during which the rudder remains in its maximum off neutral position prior to being restored to neutral position.

12. In combination, a steering device, a directional indicator, means to produce an E. M. F. dependent upon the position of said indicator, a first selector device dependent upon the polarity of said E. M. F., a second selector device dependent upon the magnitude of said E. M. F., a reversible motor, circuit arrangements effective with said first selector device in one condition to effect clockwise rotation of said motor and in another condition to effect counterclockwise rotation of said motor, a commutator controlled by said motor, a source of E. M. F., controlled by said commutator, and means for balancing said commutator controlled E. M. F. against said directional controlled E. M. F. to change the condition of said second selector device to reverse the direction of rotation of said motor.

13. In combination, a steering device, a source of directional control signals, a relay controlled by said signals, a two position switch controlled by said relay, a reversible motor, circuit arrangements effective with said switch in one position to control clockwise rotation of said motor and effective in another position to control counterclockwise rotation of said motor, a commutator controlled by said motor, differential windings for said switch one of said windings being energized from said source of control signals and the other winding being energized under control of said commutator, and a holding circuit for said relay including said commutator, said commutator arrange to break said holding circuit when the steering device is in a preselected neutral position.

14. In a departure control system, a rudder or similar steering member, compass controlled means for automatically moving said rudder off-neutral to a predetermined extent and in a predetermined direction to correct for a given departure, means for returning said rudder to its neutral position prior to complete correction of said departure, and means for delaying the commencement of said return movement of said rudder substantially independent of the period during which said rudder is moved to its off-neutral position.

15. In a departure control system, a rudder or similar steering member, compass controlled means for automatically moving said rudder to a predetermined extent and in a predetermined direction to correct for a given departure, means for restoring said rudder to its neutral position substantially independently of the compass indication, and a variable impedance for adjusting the extent of rudder movement.

16. In a departure control system, a rudder or similar steering member, compass controlled means for automatically moving said rudder to a predetermined extent and in a predetermined direction to correct for a given departure, means for progressively decreasing the rate of movement of said rudder as the latter departs from its neutral position, and means for restoring said rudder to its neutral position.

17. In a departure control system, a rudder or similar steering mechanism, compass controlled means for oscillating the rudder between neutral and an angular position variable according to said departure, and means substantially independent of the particular angular position to which the rudder is moved for controlling the period during which the rudder remains in said angular position prior to being restored to neutral position.

18. In a departure control system, a rudder or similar steering mechanism, compass controlled means for oscillating the rudder between neutral and an angular position variable according to said departure, means substantially independent of the particular angular position to which the rudder is moved for controlling the amplitude of the rudder oscillations, and means for controlling the period during which the rudder remains in said angular position prior to being restored to neutral position.

19. In a departure control system, a rudder or similar steering member, electromagnetic means for oscillating the rudder in a recurrent manner between neutral and an angular position determined by said departure, compass controlled means for reversibly energizing said electromagnetic means, and means for controlling the amplitude and rate of oscillation of the rudder.

20. In a departure control system, a steering rudder or the like, means for generating steering control currents, electromagnetic means for causing said rudder to oscillate between a preselected neutral position and an off-neutral position determined by and in proportion to the departure and then between said off-neutral position and the neutral position, and means for applying said control currents to reversibly energize said electromagnetic means to cause said oscillations to continue until the required amount of steering has been effected.

21. A system according to claim 20 in which the said oscillations are repeated with decreasing amplitude to effect the required amount of steering.

22. A system according to claim 20 in which means are provided for controlling the amplitude of the rudder oscillations in accordance with the extent of steering required and also in accordance with weather conditions and the like.

23. In a departure control system, a rudder or similar steering member, electromagnetic means for actuating said rudder, compass controlled means for reversibly energizing said electromagnetic means to move said rudder to an extent and in a direction determined by said compass and in proportion to the extent of departure to correct for said departure and for automatically and positively restoring said rudder to its neutral position prior to complete correction of said departure, and means for causing the rudder to repeat the foregoing cycle until the departure is completely corrected.

24. In a departure control system, a directional indicator, a rudder or similar steering member, electromagnetic means for actuating said rudder, means controlled by the movements of said indicator and said rudder for reversibly energizing said electromagnetic means for automatically moving said rudder to an extent and in a direction determined by said indicator to correct for a given departure, for automatically and positively restoring said rudder to its neutral position prior to complete correction of said departure, and for causing the rudder to repeat the foregoing cycle until the departure is completely corrected.

25. In a departure control system, a directional indicator, a rudder, electromagnetic actuating means for said rudder, means for creating currents corresponding to the indications of said indicator, means for creating currents corresponding to the position of said rudder, and control means dependent upon said currents for reversibly energizing said electromagnetic means for moving said rudder in a direction and to an extent determined by said indicator to correct for a given departure, for restoring said rudder to its neutral position prior to complete correction of said departure, and for causing said rudder to repeat the foregoing cycle until the departure is completely corrected.

26. In a departure control system, a compass, a rudder or similar steering member, electromagnetic means for moving said rudder, compass controlled means for energizing said electromagnetic means to move said rudder to an extent and in a direction determined by said compass to correct for a given departure, and means effective when said rudder has been moved to said extent for reversibly energizing said electromagnetic means to return said rudder to its neutral position substantially independently of the compass indication.

HUMPHREY F. PARKER.